United States Patent
Simpkins et al.

(10) Patent No.: US 10,065,732 B2
(45) Date of Patent: Sep. 4, 2018

(54) SYSTEMS AND METHODS OF TRACKING ROTOR BLADES

(75) Inventors: William Simpkins, Knoxville, TN (US); John Wilson, Knoxville, TN (US); David Dorris, Powell, TN (US)

(73) Assignee: Technology for Energy Corporation, Knoxville, TN (US)

( * ) Notice: Subject to any disclaimer, the term of this patent is extended or adjusted under 35 U.S.C. 154(b) by 768 days.

(21) Appl. No.: 13/590,326

(22) Filed: Aug. 21, 2012

(65) Prior Publication Data

US 2014/0064966 A1 Mar. 6, 2014

(51) Int. Cl.
*B64C 27/00* (2006.01)
*G01J 1/02* (2006.01)
*G01J 1/06* (2006.01)
*G02B 27/30* (2006.01)

(52) U.S. Cl.
CPC .......... *B64C 27/008* (2013.01); *G01J 1/0214* (2013.01); *G01J 1/0266* (2013.01); *G01J 1/0271* (2013.01); *G01J 1/0295* (2013.01); *G01J 1/06* (2013.01); *G02B 27/30* (2013.01); *G01J 2001/061* (2013.01)

(58) Field of Classification Search
CPC ..... B64C 27/008; G01J 1/0214; G01J 1/0266; G01J 1/0411; G01J 1/0437; G01J 1/0455; G01J 1/0462; G01J 1/06; G01J 2001/061; G01J 1/0271; G01J 1/0295; G01J 1/0403; G01J 1/0422; G01J 1/0466; G02B 27/30
USPC .................. 702/151, 166; 359/641
See application file for complete search history.

(56) References Cited

U.S. PATENT DOCUMENTS

| | | | | |
|---|---|---|---|---|
| 3,023,317 A | * | 2/1962 | Mohan | G01C 3/08 250/222.1 |
| 3,890,718 A | * | 6/1975 | Gregerson | G01C 19/38 33/301 |
| 4,021,808 A | * | 5/1977 | Spratt | 342/417 |
| 4,465,367 A | * | 8/1984 | Sabatier | G01B 11/00 356/23 |
| 4,583,862 A | * | 4/1986 | Ferrar et al. | 356/139.03 |
| 4,604,526 A | | 8/1986 | Moir | |
| 4,812,643 A | * | 3/1989 | Talbot | 250/222.1 |
| RE33,097 E | | 10/1989 | Styles | |
| 4,887,087 A | * | 12/1989 | Clearwater | 342/61 |
| 5,249,470 A | * | 10/1993 | Hadley et al. | 73/655 |
| 5,929,431 A | | 7/1999 | Hadley | 250/206.1 |
| 6,415,206 B1 | * | 7/2002 | Ventres | 700/280 |
| 6,448,924 B1 | * | 9/2002 | Hafer, Jr. | 342/28 |
| 6,922,059 B2 | * | 7/2005 | Zank et al. | 324/457 |

(Continued)

FOREIGN PATENT DOCUMENTS

FR 2523301 A1 * 9/1983
JP 04246764 3/2004

(Continued)

*Primary Examiner* — Jason Shanske
*Assistant Examiner* — Christopher R Legendre
(74) *Attorney, Agent, or Firm* — Pitts & Lake, P.C.

(57) ABSTRACT

A blade tracking system including a detector having one or more sensors to detect radiation from at least one field of view of the detector, the one or more sensors generating signals based on changes in incident radiation to the one or more sensors as a rotor blade passes the field of view, and a processor to determine a pass time for the rotor blade to pass through the at least one field of view based on the generated signals.

33 Claims, 11 Drawing Sheets

(56) References Cited

U.S. PATENT DOCUMENTS

| | | | |
|---|---|---|---|
| 7,436,495 B2* | 10/2008 | Tachino | G01S 7/4811 |
| | | | 356/4.01 |
| 7,456,510 B2* | 11/2008 | Ito et al. | 290/44 |
| 7,546,975 B2* | 6/2009 | Richardson | 244/17.13 |
| 7,751,059 B2 | 7/2010 | Van Asten et al. | |
| 7,813,040 B2 | 10/2010 | Colbourne et al. | |
| 8,190,393 B2* | 5/2012 | Moir | 702/151 |
| 8,565,941 B2* | 10/2013 | Lading | 701/4 |
| 9,599,711 B2* | 3/2017 | Lilly | B64C 27/008 |
| 2009/0324409 A1 | 12/2009 | Volanthen et al. | |
| 2010/0047067 A1 | 2/2010 | Houser et al. | |
| 2010/0063767 A1* | 3/2010 | Moir | 702/150 |
| 2010/0121214 A1* | 5/2010 | Giftakis | A61B 5/031 |
| | | | 600/544 |
| 2011/0150649 A1 | 6/2011 | White et al. | |
| 2011/0210255 A1* | 9/2011 | Kim | G01T 1/2985 |
| | | | 250/362 |
| 2011/0259994 A1 | 10/2011 | Jolly et al. | |
| 2013/0236007 A1* | 9/2013 | Munro | H04L 9/0861 |
| | | | 380/44 |
| 2014/0064966 A1* | 3/2014 | Simpkins et al. | 416/61 |

FOREIGN PATENT DOCUMENTS

| | | |
|---|---|---|
| JP | 04688928 | 5/2006 |
| JP | 2008228570 | 6/2008 |
| WO | WO 2009085639 | 12/2008 |
| WO | WO 2010127675 | 5/2010 |

* cited by examiner

SYSTEMS AND METHODS OF TRACKING ROTOR BLADES

CROSS-REFERENCE TO RELATED APPLICATIONS

Not Applicable

FIELD OF INVENTIVE CONCEPT

The present inventive concept relates generally to systems and methods of tracking moving objects, and more particularly relates to detecting the position and timing of aircraft rotor blades during operation.

BACKGROUND

It is desirable to track the position and timing of aircraft rotor blades in order to maintain, adjust, and improve rotor blade operations. For example, knowing the position of helicopter blades permits the person maintaining the aircraft to make suitable adjustments to improve the rotor operations.

Known techniques for detecting the position and timing of helicopter rotor blades include, for example, the use of optical systems to create an image of a blade tip onto a sensor so that the moving blade will generate a sensor output that can be related to the blade position, and the use of two light sensors to measure the time it takes for a blade to pass between two divergent fields of view of the sensors to create timing and position reference signals.

One of the challenges of known techniques is that the measurement relies on light level contrasts between the blade and dynamic background light conditions, making it difficult to achieve accurate measurements during changing light conditions, for example during different times of day, various sun/cloud conditions, etc. Such systems can struggle in poor lighting conditions where there is little contrast between the blade and the sky such as a dark cloudy day and may not be able to detect the blade pass event. Active illumination can be used to improve the operations but most of these systems require the addition of a retro-reflective target to aid detection. Moreover, in situations where the sun has a direct path into the optics system, the light can either saturate the detectors or create false events, corrupting the timing measurements.

The difficulties can be exacerbated by differing light deflection and absorption characteristics attributable to different sets of rotor blades, for example due to age of the blades, materials, color schemes, blade coatings, and the like.

BRIEF SUMMARY

Example embodiments of the present general inventive concept provide improved systems and methods of detecting and tracking rotary blades to compensate for changed lighting conditions and blade characteristics.

Example embodiments of the present general inventive concept also provide improved systems and methods of detecting and tracking rotary blades to increase the accuracy of rotor blade position and timing measurements during typical aircraft operating conditions. Some embodiments enable the person maintaining the aircraft to make suitable adjustments to improve the rotor operations.

Example embodiments of the present general inventive concept can be achieved by providing a blade tracking system, including a detector having one or more sensors to detect radiation from at least one field of view of the detector, the one or more sensors generating signals based on changes in incident radiation to the one or more sensors as a rotor blade passes the at least one field of view, the detector further including a first chamber having a first aperture to receive the incident radiation therein, and a second chamber oriented adjacent to the first chamber and having a second aperture between the first chamber and the second chamber to deliver a portion of the incident radiation to at least one of the sensors, and a processor to determine a pass time for the rotor blade to pass through the at least one field of view based on the generated signals.

The field of view can be a divergent field of view, and the first and second apertures can be aligned to create the divergent field of view.

The incident radiation can include background radiation incident to the one or more sensors, and the blade tracking system can further include a background subtraction module to remove at least a portion of the background radiation before the pass time is determined.

The detector can include a dividing wall to separate the first chamber from the second chamber, and the second aperture can be located at the dividing wall to direct the portion of incident radiation from the first chamber to the second chamber. The second aperture can cooperate with the first aperture to create the divergent field of view such that the divergent field of view extends beyond the first aperture.

The detector can include a third chamber oriented adjacent to the second chamber and having a third aperture located between the second chamber and the third chamber to deliver a portion of the incident radiation directed from the first chamber to the second chamber to the one or more sensors. The first, second, and third apertures can cooperate to create the divergent field of view.

Example embodiments of the present general inventive concept can also be achieved by providing a blade tracking system, including a detector having one or more sensors to detect radiation from at least two fields of view of the detector, the one or more sensors generating signals based on changes in incident radiation to the one or more sensors as a rotor blade passes the fields of view, each signal having a leading edge and a trailing edge as the rotor blade enters and exits a respective field of view, and a processor to determine a pass time for the rotor blade to pass through the fields of view based on a time difference between selected locations between the leading edges and the trailing edges of each signal.

The selected location can be a midpoint between the leading edges and the trailing edges. The processor can determine a pass time for the rotor blade to pass through the fields of view based on a time period at which the signals are at the maxima or minima.

The fields of view can be divergent fields of view, and the processor can determine a height of the blade relative to the detector based on the pass time through the divergent fields of view. The processor can compare pass times of different rotor blades at one of the fields of view to compute lead/lag characteristics of a given blade relative to another rotor blade.

The system can include a background subtraction module to adjust the current levels based on changes in the level of background radiation. This adjustment can occur before the pass time of the blade is calculated.

The processor can determine a threshold level for each signal based on an amplitude of each signal, respectively, and the processor can determine the midpoint for each signal based on a start time of the leading edge and an end time of the trailing edge at the threshold level, respectively.

The threshold level can be adjusted based on the amplitude of prior signals.

Example embodiments of the present general inventive concept can also be achieved by providing a blade tracking system, including a detector having one or more sensors to detect radiation from at least one field of view of detector, the one or more sensors generating signals based on changes in incident radiation to the one or more sensors as a rotor blade passes the field of view, the incident radiation including background radiation incident to the one or more sensors, a background subtraction module to remove at least a portion of a signal associated with the background radiation to define a background subtracted signal, and a processor to determine a pass time for the rotor blade to pass through the field of view using the background subtracted signal.

Example embodiments of the present general inventive concept can also be achieved by providing a blade tracking system, including a detector having one or more sensors to detect radiation from at least two fields of view of the detector, the one or more sensors generating signals based on changes in incident radiation to the one or more sensors as a rotor blade passes the fields of view, each signal having a leading edge and a trailing edge as the rotor blade enters and exits a respective field of view, and a processor to create a threshold level at the leading and trailing edges based on a magnitude of the signals, and to determine a pass time for the rotor blade to pass through the fields of view based on a time difference between selected locations between the leading edges and the trailing edges of each signal at the threshold level.

Example embodiments of the present general inventive concept can also be achieved by providing a blade tracking system, including a detector having one or more sensors to detect radiation from at least one field of view the detector, the one or more sensors generating a signal based on changes in incident radiation to the one or more sensors as a rotor blade passes the field of view, the signal having a maxima or a minima when the blade is within the at least one field of view, and a processor to determine a pass time for the rotor blade to pass through the field of view based on a time period at which the signal is at the maxima or minima.

Example embodiments of the present general inventive concept can also be achieved by providing a detector system, including a radiation sensor, a first chamber having a first aperture to receive incident radiation therein, and a second chamber oriented proximate to the radiation sensor, the second chamber having a second aperture communicating with the first chamber to direct a portion of the incident radiation from the first chamber to the radiation sensor, wherein the first and second apertures are aligned to create at least one divergent field of view of the radiation sensor.

The detector system can include a dividing wall separating the first chamber and the second chamber, the dividing wall including the second aperture to direct the portion of incident radiation to the radiation sensor, the first aperture cooperating with the second aperture to create the divergent field of view such that the divergent field of view extends beyond the first aperture and outside the first chamber.

The system can include adjustable gain electronics to enhance signal levels.

The processer can calculate an amplitude of each signal, and can adjust the gain electronics based on the amplitude.

The processor can also include a low pass filter to remove noise from the output of the sensors and remove noise from the once per revolution signal.

The processor can also include a notch filter to remove noise at a specific frequency.

A radiation source can be provided to illuminate the blade when the incident radiation reaches a predetermined level.

The processor can correlate the signals to a corresponding rotation of the blade, and the processor can calculate blade tracks based on the correlated signals for a plurality of rotating blades.

Example embodiments of the present general inventive concept can also be achieved by providing a method of tracking a rotor blade, including detecting radiation from at least two fields of view, generating a signal based on changes in detected radiation from each field of view as the blade passes each field of view, each signal having a leading edge and a trailing edge as the blade enters and exits a respective field of view, selecting a location between the leading and trailing edges of each signal, and calculating a pass time for the blade to pass through the fields of view based on a time difference between the selected location of each signal.

The method can also include adjusting the signal to correspond to changes in the level of background radiation before the pass time is calculated.

The method can also include calculating a threshold level for each signal based on an amplitude of each signal, respectively, and calculating a midpoint for each signal based on a start time of the leading edge and an end time of the trailing edge at the threshold level, respectively. The processor can selectively change the threshold level from run to run, for example, based on operating conditions and/or user input.

The method can also include correlating the signals to a corresponding timing within the rotations of the blade to exclude spurious events.

Additional features and embodiments of the present general inventive concept will be set forth in part in the description which follows and, in part, will be obvious from the description, or may be learned by practice of the present general inventive concept.

BRIEF DESCRIPTION OF THE FIGURES

The following example embodiments are representative of exemplary techniques and structures designed to carry out the objectives of the present general inventive concept, but the present general inventive concept is not limited to these example embodiments. Moreover, in the accompanying drawings and illustrations, the sizes and relative sizes, shapes, and qualities of lines, entities, and regions may be exaggerated for clarity. A wide variety of additional embodiments will be more readily understood and appreciated through the following detailed description of the exemplary embodiments, with reference to the accompanying drawings in which.

DETAILED DESCRIPTION

Reference will now be made to the example embodiments of the present general inventive concept, examples of which are illustrated in the accompanying drawings and illustrations. The example embodiments are described herein in order to explain the present general inventive concept by referring to the figures.

Although example embodiments of the present general inventive concept will be particularly described as being applied to helicopter blades, it will be appreciated that the present general inventive concept can be applied to a variety of other rotor-based systems, for example propellers, fans, windmills, or other rotating machinery, without departing from the scope and spirit of the present general inventive concept.

Figure 1:
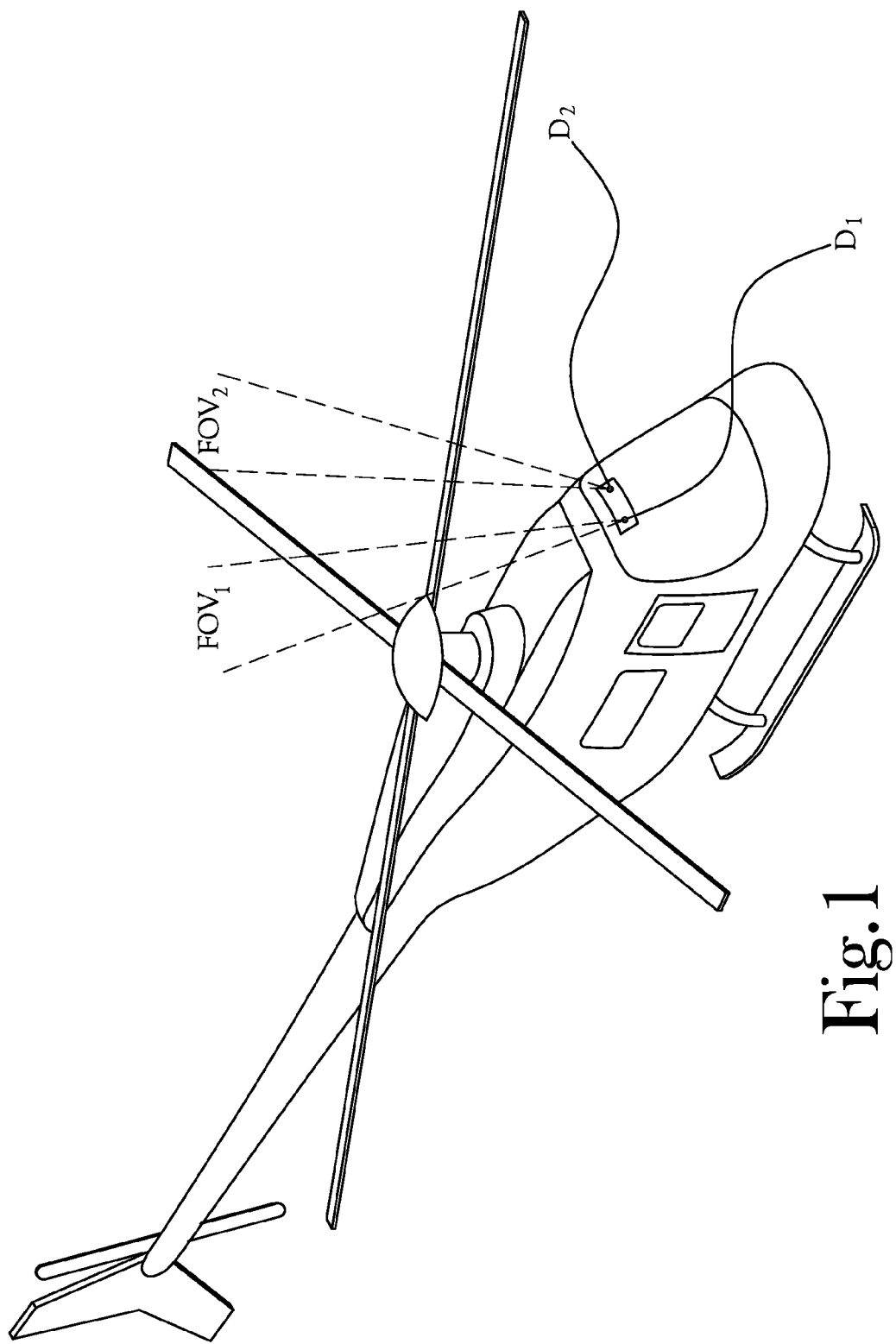
FIG. 1 is a perspective view of a helicopter using detectors according to an example embodiment of the present general inventive concept.

Referring to FIG. 1, example embodiments of the present general inventive concept can be implemented in connection with a helicopter having a detector system creating one or more divergent fields of view to measure the times at which a helicopter rotor blade passes through the fields of view.

As illustrated in the example embodiment of FIG. 1, two detector units $D_1$ and $D_2$ can be used to create two divergent 'v-shaped' fields of view (FOV). Although FIG. 1 illustrates two detectors mounted inside of the aircraft to create the divergent fields of view, it is understood that additional detectors and/or different mounting locations could be used to create similar or additional fields of view without departing from the scope and spirit of the present general inventive concept. It is also noted that although the detectors $D_1$ and $D_2$ are illustrated as a single unit, the detectors could be formed as separate units, or in combination with other units. Moreover, it is important to note that throughout the present disclosure, the example detectors are discussed in terms of having optics which create a diverging field of view (FOV) for the radiation sensor D by virtue of aperture alignment (see, e.g., FIG. 7A). However, the present general inventive concept is not limited to any particular configuration of the detector, and it is possible to use detector units that do not create a diverging optical path. For example, instead of using detectors with diverging optical paths, it is possible to track with two non-diverging optics paths by directing, or aiming, the two non-diverging optics paths such that they create a single diverging field of view for the sensor. It is also possible to carry out embodiments of the present general inventive concept using a single detector or multiple detectors to create one or more fields of view to track the time in cone and/or height of a rotor blade, using the techniques and designs described herein. All such configurations and modifications are intended to be included within the scope and spirit of the present general inventive concept.

Figure 2:
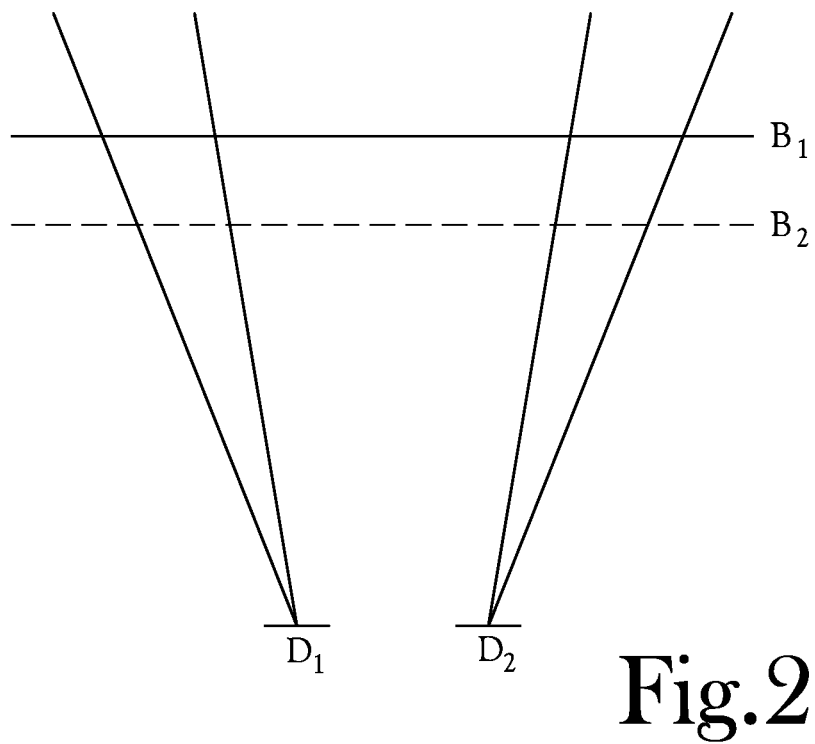
FIG. 2 is a diagrammatic illustration of diverging fields of view created by the detectors of FIG. 1, according to an example embodiment of the present general inventive concept.

FIG. 2 is a diagrammatic illustration of the example divergent fields of view created by the detectors of FIG. 1, showing two different blade paths $B_1$ and $B_2$ and respective 'time in the cone.' As illustrated in FIG. 2, blade path $B_1$ has a longer distance to cover between detectors $D_1$ and $D_2$ compared to $B_2$, which has a lower blade path. Thus, assuming $B_1$ and $B_2$ are both rotating at the same RPM, the time in the cone for blade path $B_1$ will be greater than the time for blade path $B_2$. It is noted that although two fields of view are illustrated in FIG. 2, embodiments of the present general inventive concept, such as, but not limited to, determining time in cone and/or height of blade, can be implemented using a single field of view, created by single or multiple detectors, and such modifications are intended to be included in the scope of the present general inventive concept.

Figure 3:
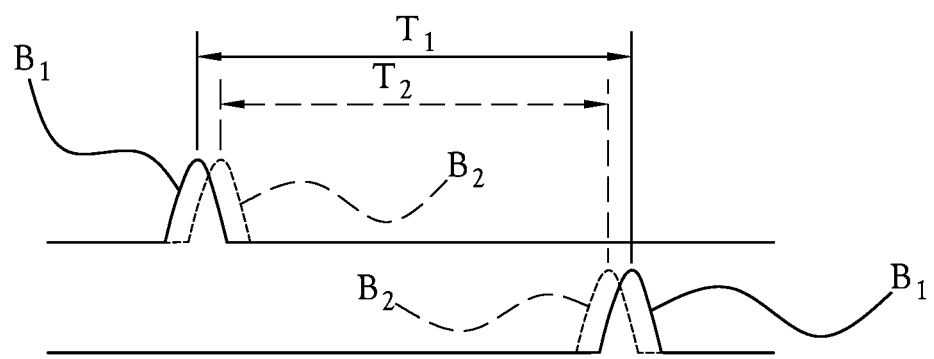
FIG. 3 is an example timing diagram of signals representing different blade tracks through the diverging fields of view, according to an example embodiment of the present general inventive concept.

FIG. 3 is an example timing diagram of pulse signals corresponding to different blade tracks, such as $B_1$ and $B_2$. As illustrated in FIG. 3, the time $T_1$ for blade path $B_1$ is greater than the time $T_2$ for blade path $B_2$. Accordingly, knowing the dimensions and angle of the respective fields of view (FOV), i.e., where the detectors $D_1$ and $D_2$ are aimed, allows $T_1$ and $T_2$ to be used to calculate track information of the blades $B_1$ and $B_2$. The more accurately the timing of each blade can be measured, the more accurate the estimate of each blade's track information can be. For example, the detection times $T_1$ and $T_2$ can be used to compute rotor blade heights for the respective blades $B_1$ and $B_2$, as well as speed, and lead/lag spacing. This enables the system to accurately determine rotor blade position and timing during typical operating conditions. For example, the blade track can be measured under typical operating conditions of the helicopter, such as flat track on the ground, hover, and flying at speed. The measurements can be used to minimize the difference in the lift of each blade of a helicopter by adjusting all the blades to fly in the same track. The height of the rotor blade can be determined based on the pass time through each FOV, and subsequent, or different, pass times at the same field of view can be compared to compute lead/lag characteristics of a given rotor blade relative to other rotor blades.

Figure 4:
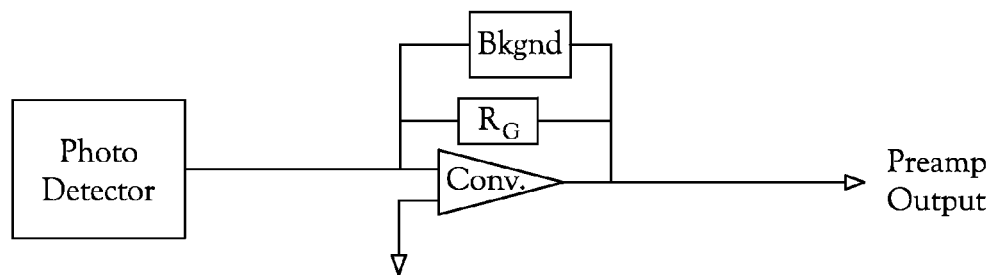
FIG. 4 is a block diagram illustrating a current to voltage converter with a background subtraction feature according to an example embodiment of the present general inventive concept.

FIG. 4 is a block diagram illustrating a current to voltage converter with a background subtraction feature according to an example embodiment of the present general inventive concept. Blades are detected by comparing the light contrast of the blade to the background sky. In daylight conditions, the blade appears darker than the bright background sky. For nighttime operation, an external light source can be used to brighten the blades compared to a dark background sky. For example, a radiation source can be provided on the detector, or elsewhere in the system, to illuminate the blade when the incident radiation reaches a predetermined level. As the blade passes through the field of view of the detector, it gradually obstructs the background light until the full blade width is in the FOV. As the blade continues to pass, the background light gradually comes back into the FOV. This creates a waveform with a leading edge as the blade comes into the FOV, and a trailing edge as the blade moves out of the FOV. In this example, radiation detectors are connected to the input of a current-to-voltage (I-to-V) converter to detect a change in the incident light to the detector as the blade enters and exits its field of view, thus generating a pulse signal having a start time defined by the leading edge, and an end time defined by the trailing edge.

Referring to FIG. 4, additional improvements in data quality can be achieved by implementing background subtraction features to the example detection circuit of FIG. 4. As discussed above, one of the challenges of accurately measuring position and timing information of rotor blades is that the measurement relies on light level contrasts between the blades and dynamically changing background light conditions. These changes in background lighting (due to clouds, sun, rain, darkness, etc.) make it difficult to achieve consistent measurements over time, as current from the detector will change according to the background lighting conditions.

For example, the sky has variant light intensity, as much as two orders of magnitude, based on weather conditions and the time of day. Thus, the incident radiation includes background radiation incident to the one or more sensors. With various sky intensities, the amount of light between blades will also vary. This change in output of the detector creates a challenge for the I-to-V converter to maintain the proper dynamic range at the output.

To reduce the effect of these changing background conditions, the present inventors have implemented a background subtraction circuit that pushes the DC component of the detector signal to a ground level, regardless of the background lighting intensity. The background subtraction module can remove at least a portion of the background radiation before the pass time is determined, as described in more detail below.

Figure 11:
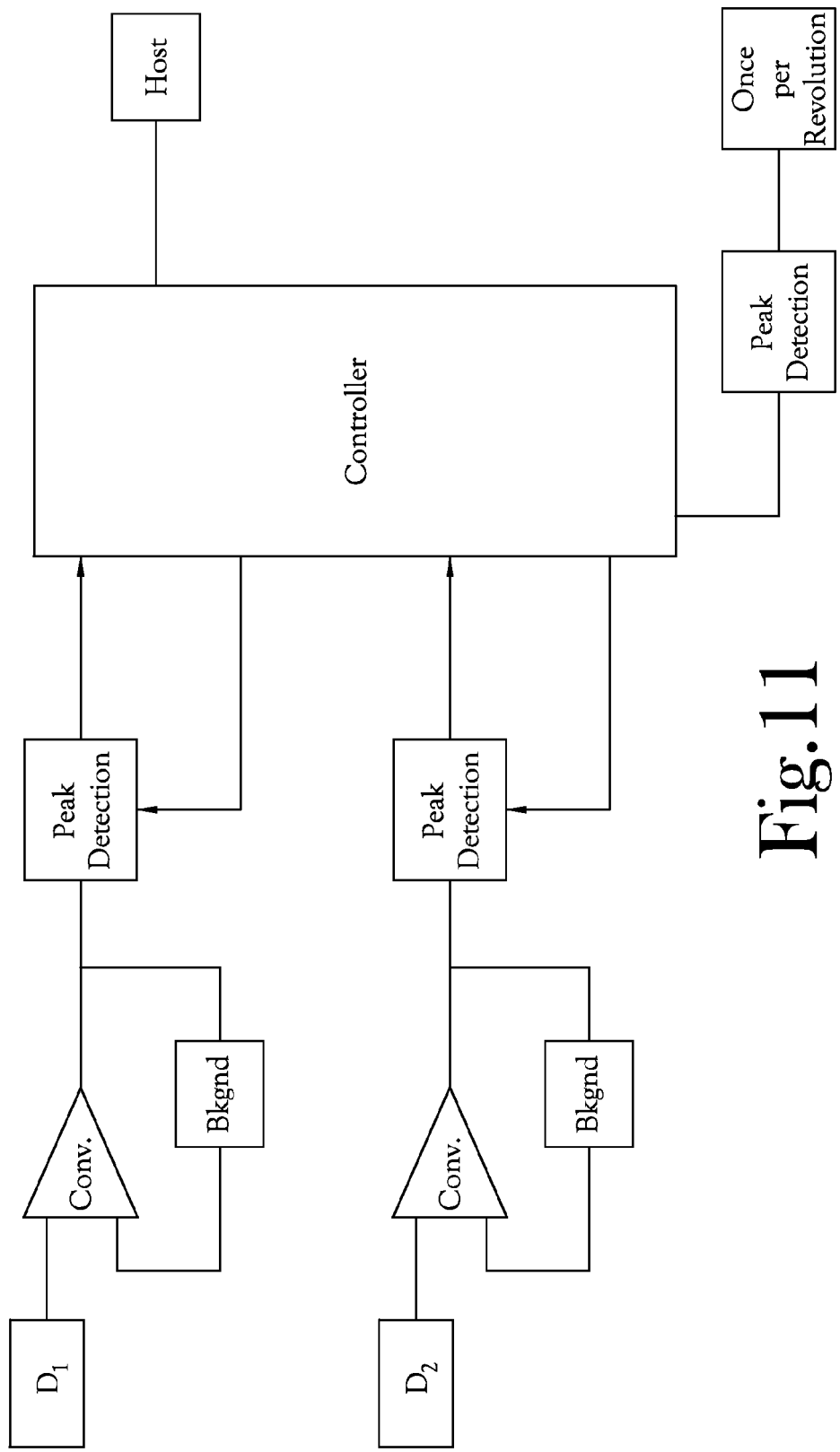
FIG. 11 is a system block diagram according to an example embodiment of the present general inventive concept.

Referring to FIGS. 4 and 11, the example background subtraction module (Bkgnd) is a feedback circuit for the I-to-V converter. The Bkgnd module adjusts current to the I-to-V converter such that the DC level of the output signal of the I-to-V converter is around 0 volts. Thus, when the current from the photo detectors changes due to the background lighting, the background subtraction circuit correspondingly adjusts the amount of current going into the I-to-V converter, thus offsetting any change in current from the detector due to varying background intensity levels. As a result, current levels attributable to blade passing are input to the I-to-V converter, while current levels attributable to background intensity changes are offset. This has the benefit of generating an output that contains just the blade signal that is relevant to the blade tracking system. Since the signal contains a component corresponding to a level of background radiation incident on the detector, the background subtraction module can adjust the output signal based on changes in the level of background radiation before the pass time is calculated.

Implementing background subtraction (Bkgnd) to remove the ambient signal level at signal detection allows the ensuing circuit to process only the dynamic portion of the signal, permitting the circuit to operate over a wide range of ambient light conditions and increasing the overall signal to noise ratio. The background subtraction circuit can reject very bright ambient light, yet provide high AC gain for best signal-to-noise ratio. The output voltage is integrated and fed back to the inverting input through a resistor. This drives the average (DC) voltage at the output to zero. Such a circuit also corrects output offsets produced by downstream circuits.

Unlike prior art systems which capture timing information based on the rising edge of the pulse, the present inventors have implemented an improved method of obtaining timing information by using the average of the measured times from the leading and trailing edges, and/or a time period at which the signal is at a maxima or minima.

Figure 5:
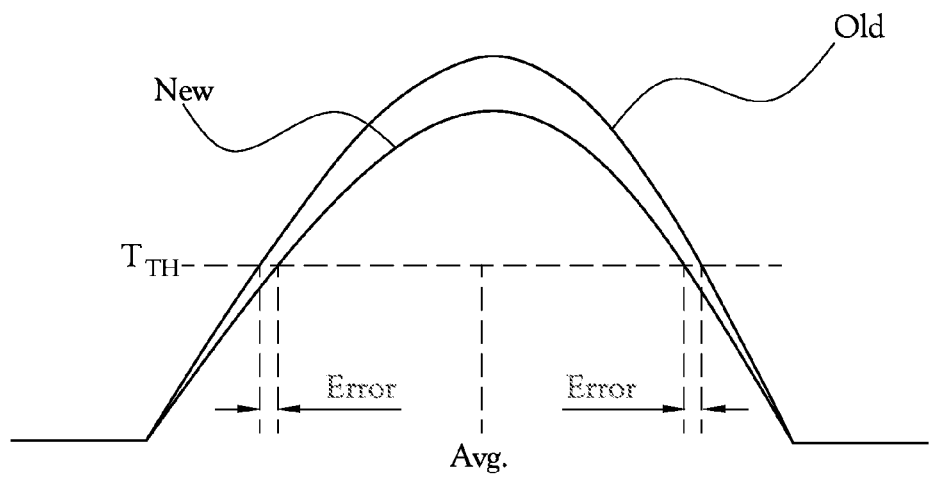
FIG. 5 is a diagram illustrating a reduction of error by calculating a blade pass time based on an average of the leading edge and trailing edge of a detector pulse signal, according to an example embodiment of the present general inventive concept.

FIG. 5 is a diagram illustrating the reduction of error by calculating a blade pass time based on an average of the leading edge and trailing edge of a detector signal, according to an example embodiment of the present general inventive concept. This is important as the pulse signal generated by the detector will be different, depending on characteristics of the blade, such as color, age, material, coating, etc. For example, in FIG. 5, a first signal was generated using an old blade, and a second signal was generated using a new blade. As illustrated in FIG. 5, there is a timing Error between the signals at a threshold level $T_{TH}$, wherein the start times and the end times of the respective signals are different, but the average is the same. Accordingly, by using the average (Avg.) of the measured times from the leading and trailing edges to calculate timing information, the Error component can be minimized, even eliminated. Thus, having the pulse detection logic note both the leading and trailing edges, it is possible to configure the system to compute an average of the leading and trailing edges as the midpoint of the rising and falling edges. Using the average of the start and end times of the signal, or other selected location between the leading and trailing edges, as opposed to strictly relying on the leading edge of the signal, has the distinct advantage of removing any timing measurement errors introduced by different qualities of blades which may yield different pulse heights and start/end times. Using a selected location, such as midpoint of the pulse, to calculate the timing information will eliminate, or at least reduce, such errors. It is important to note that in some embodiments, for example with digital signals that do not define a leading and trailing edge, it is possible to use a midpoint, or other selected level, between a maxima or minima of the signal, depending, for example, on whether the system is actively or passively illuminated, to calculate the timing information. It is also possible for the processor to determine a pass time for the rotor blade to pass through the divergent fields of view based on a time period at which the signals from each sensor are at the maxima or minima. Other techniques of digital time measurement, such as curve-fitting and using digital constant-fraction discriminators, may also be used. For example, it is possible to program the FPGA to curve fit the data to find center time of the pulses. In this case the FPGA may not use leading edge or trailing edge but rather the data between the leading and trailing edges, or data representing the pulse detection.

Figure 6A:
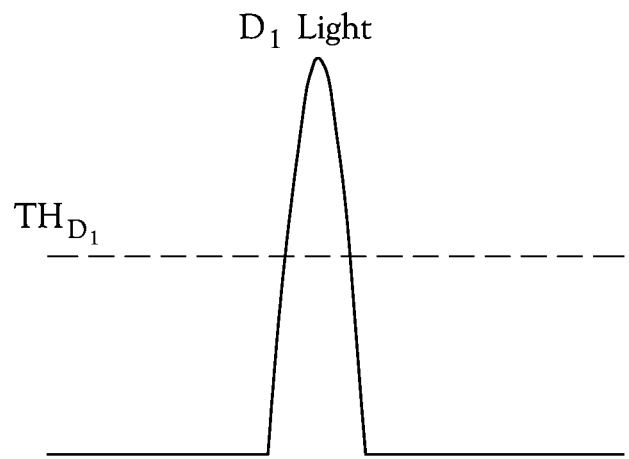
FIGS. 6A and 6B illustrate example signals having thresholds adjusted to the amplitude of the signal, according to an example embodiment of the present general inventive concept.
Figure 6B:
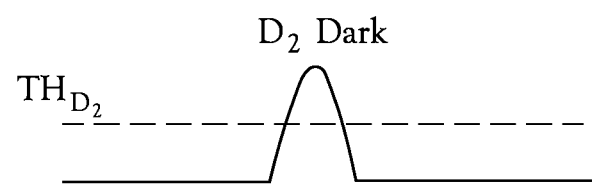

FIGS. 6A and 6B illustrate example signals having thresholds $TH_{D1}$ and $TH_{D2}$ based on the amplitude of the signal, according to an example embodiment of the present general inventive concept. FIG. 6A corresponds to a blade-pass signal from $D_1$ under light conditions, whereas FIG. 6B corresponds to blade-pass signal from $D_2$ under darker conditions (e.g., cloud over $D_2$). As illustrated in FIGS. 6A and 6B, highly variant lighting conditions can result in various amplitudes and pulse heights for the respective detector signals.

FIGS. 6A and 6B illustrate example waveforms of how the thresholds can be set based upon the amplitude of the pulses. To maintain consistent timing across these varying light conditions, the amplitude of each pulse is continually monitored, and the threshold location $TH_{D1}$ and $TH_{D2}$ of each pulse is adjusted based on the amplitude of the pulse, to reduce variations in start times and end times of the pulse due to varying light condition. For example, in some embodiments, the threshold level is adjusted to a percentage of pulse height, such as 40%. Because each detector is aimed at a different part of the sky, each may be looking at a different lighting condition (e.g. bright cloud vs. dark cloud). Thus, each detector can have separate threshold controls.

Using a dynamic and intelligent pulse detection method allows the controlling processor to adjust the pulse detection of blade events over a wide range of signal levels allowing the pulse detection to operate over a wide range of contrast levels between the blade detection system and the background sky. This permits the tracker to operate in both low and high ambient light conditions.

Figure 7A:
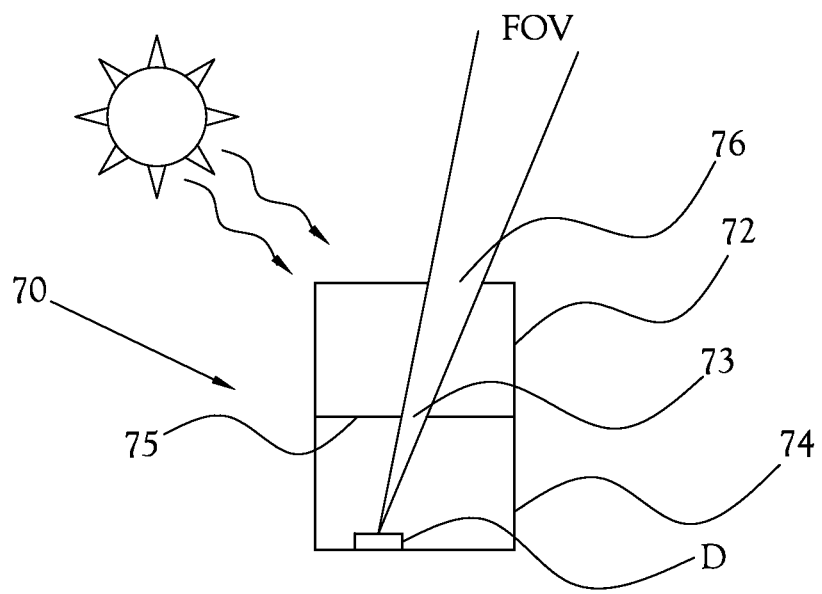
FIG. 7A illustrates an optical collimator configured in accordance with an example embodiment of the present general inventive concept.

FIG. 7A illustrates an optical collimator, or detector unit, 70, configured in accordance with an example embodiment of the present general inventive concept. Referring to FIG. 7A, the detector unit 70 includes a first chamber 72 and a second chamber 74 separated by a dividing wall 75. Although the detector 70 is illustrated with two chambers 72 and 74, it is possible to configure the detector with additional chambers without departing from the scope and spirit of the present general inventive concept.

In some embodiments, the first chamber 72 includes an entrance aperture 76 to receive incident radiation therein. A second chamber 74 is sequentially oriented adjacent to the first chamber 72. The second chamber includes an internal, or exit aperture 73 to direct radiation to a radiation sensor D. As illustrated herein, each detector unit 70 (also referred to herein as D1 and D2) includes a radiation sensor D. The dividing wall 75 is located between the entrance aperture 76 and the exit aperture 73 to separate the first chamber 72 from the second chamber 74. The dividing wall includes an internal aperture 73 to direct a portion of the incident radiation received by the first chamber 72 to the second chamber 74. The aperture 73 cooperates with the entrance aperture 76 and the radiation sensor D to create a field of view FOV extending beyond the entrance aperture 76.

As illustrated in FIG. 7A, adjacent to the second chamber 74 is a radiation sensor D, to detect incident radiation via opening 76. In cooperation with the apertures, the detector unit defines a divergent, v-shaped field of view (FOV) to detect radiation, similar to as described above with respect to FIGS. 1 and 2. Stated another way, the first chamber 72 receives incident radiation from the sky via entrance aperture 76. A dividing wall 75 can be provided to separate the first chamber from the second chamber. The internal aperture 73 can be located at the dividing wall to direct the portion of incident radiation from the first chamber to the second chamber. The internal aperture 73 can cooperate with the entrance aperture 76 and sensor D to create the at least one divergent field of view FOV such that the at least one divergent field of view extends beyond the first aperture, and outside the first housing. However, as pointed out above, while it is possible to configure a detector unit that does not create a diverging optical path, FIG. 7F illustrates an example embodiment including a detector housing 100 having a pair of detector units 70 respectively defining diverging fields of view FOV1, FOV2 such that the fields of view FOV1, FOV2 diverge from one another outside the detector housing 100.

Referring to FIG. 7A, the dual chamber detector 70 provides a very limited path for light to travel directly from the sky to the radiation sensor D. Furthermore, light that enters first chamber 72 via opening 76 is heavily attenuated by ratio of exit aperture 73 to the chamber area 74. As an example, a 1 $mm^2$ aperture 73 in a poorly absorbing chamber 72 with 100 $mm^2$ of surface area with random scattering attenuates the signal by about 1/100 the ratio of the aperture 73 exit area to the incoming area. A second chamber 74 further attenuates the scattered signal with a 1 $mm^2$ detector by another 1/100 the ratio of the detector area to the chamber area. Thus, the dual chamber detector 70 dramatically reduces the potential for false blade pass events, such as shadow events, to impact the light intensity incident to the detection system. This improves the reliability of the overall system by removing high intensity scattered light or shadows that may pass the optical system and be confused with a blade pass event. For further attenuation of the light signal, it is possible to include a third chamber oriented adjacent to the second chamber and having a third aperture located between the second chamber and the third chamber to deliver a portion of the incident radiation directed from the first chamber to the second chamber to the at least one sensor. In such configuration, the first, second, and third apertures would cooperate to create the at least one divergent field of view of the detector 70.

One of the advantages of using a chamber with pinhole apertures as illustrated in FIG. 7A is to reduce the amount of light coming from angles that are not associated with the desired detector field of view from passing through. Thus, a large proportion of light outside the detector FOV will be deflected inside the chamber until it is absorbed or reaches an exit point. In some embodiments, a light absorbing color and surface finish inside the chamber can further reduce the amount of reflected light that passes through the chambers 72, 74 to the sensor D.

Figure 7B:
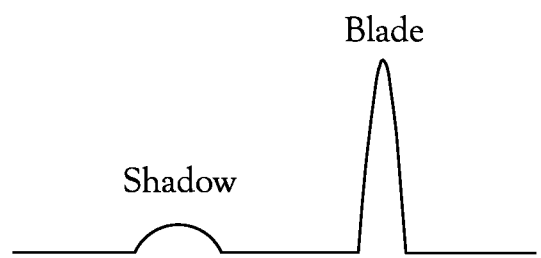
FIG. 7B illustrates shadow pulse which can be attenuated by using the example optical collimator of FIG. 7A.

FIG. 7B illustrates shadow pulse attenuated by using the example dual chamber detector of FIG. 7A. As illustrated in FIG. 7B, the attenuated shadow pulse is insignificant compared to the actual, blade pass pulse, and can be ignored.

Figure 7C:
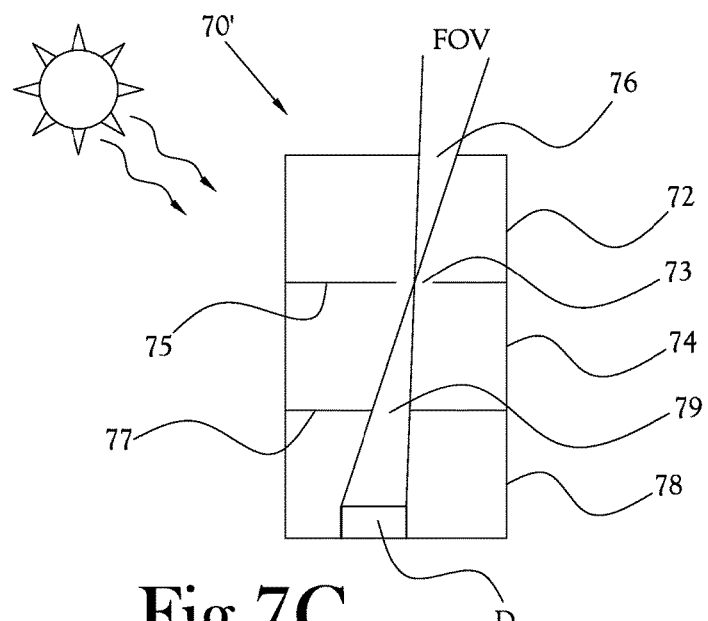
FIG. 7C illustrates an optical collimator configured in accordance with an example embodiment of the present general inventive concept.

FIG. 7C illustrates an optical collimator, or detector unit, 70', configured in accordance with another example embodiment of the present general inventive concept. Here, the detector unit 70' can include a third chamber 78 oriented adjacent to the second chamber 74 and having a third aperture 79 located on the dividing wall 77 between the second chamber and the third chamber to deliver a portion of the incident radiation directed from the first chamber to the second chamber to the at least one sensor. The first, second, and third apertures can cooperate to create a divergent field of view (FOV) of the sensor D. The additional chamber creates another opportunity to baffle the light entering the first chamber to further scatter and diffuse the light before it reaches the sensor D.

In the configuration of FIG. 7C, the apertures are formed to be approximately the same size, and the diverging view of a single detector is created by the angle created by the sensor D with the entry aperture 76. The sizing of the internal apertures 73, 79 can be selected to minimize signal loss while maximizing phantom signal attenuation. Smaller sizes tend to cause loss of signal, whereas large sizes tend to cause an increase in false signal amplitudes. In some embodiments, it can be desirable to keep the internal apertures approximately the same size as the entry aperture.

Figures 7D, 7E:
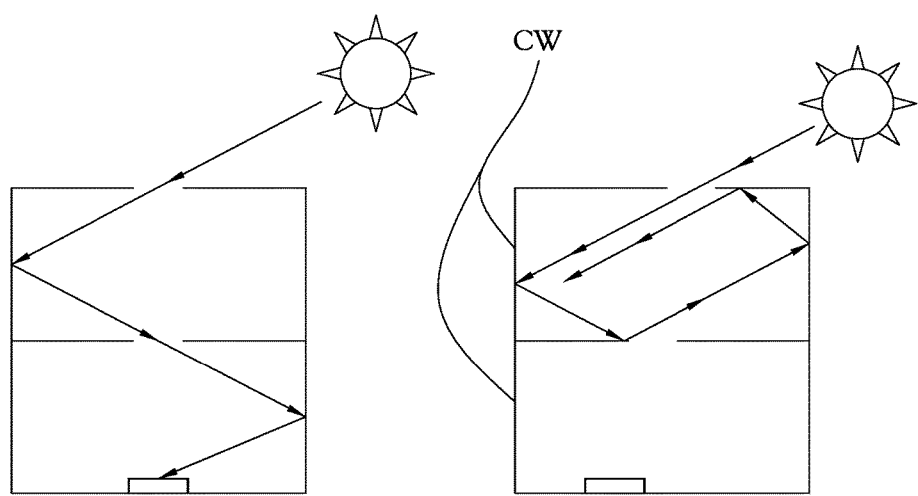
FIGS. 7D and 7E illustrate examples of radiation reflecting inside various detector chamber configurations.
Figure 7F:
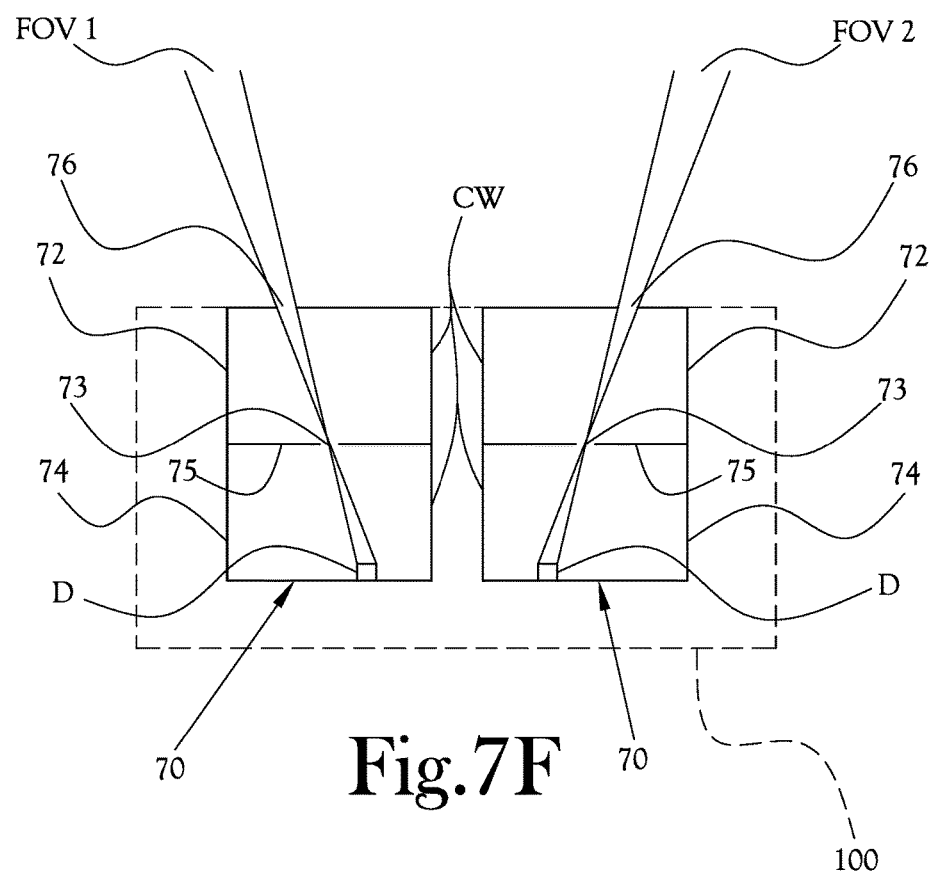
FIG. 7F illustrates a pair of uninterrupted optics paths diverging from one another outside a detector housing according to an example embodiment of the present general inventive concept.

FIGS. 7D and 7E illustrate examples of light reflecting inside detector chambers. Referring to FIG. 7D, the apertures are equally spaced with symmetrical location relative to the chamber walls. As a result, a path is created where light with single reflection bounces from a wall of the first chamber into the second chamber, and ultimately reaches the sensor. In this case, the benefit of multiple scatter attenuation is mostly lost. By comparison, locating the apertures and/or shaping the chambers asymmetrically to avoid simple reflective paths has been found advantageous. For example, referring to FIG. 7E, the apertures are located in a staggered manner with varying distances from the chamber walls (identified as CW). Such configuration can inhibit simple reflective paths of radiation to the sensor, increasing the benefit of multiple scatter attenuation.

Figure 8A:
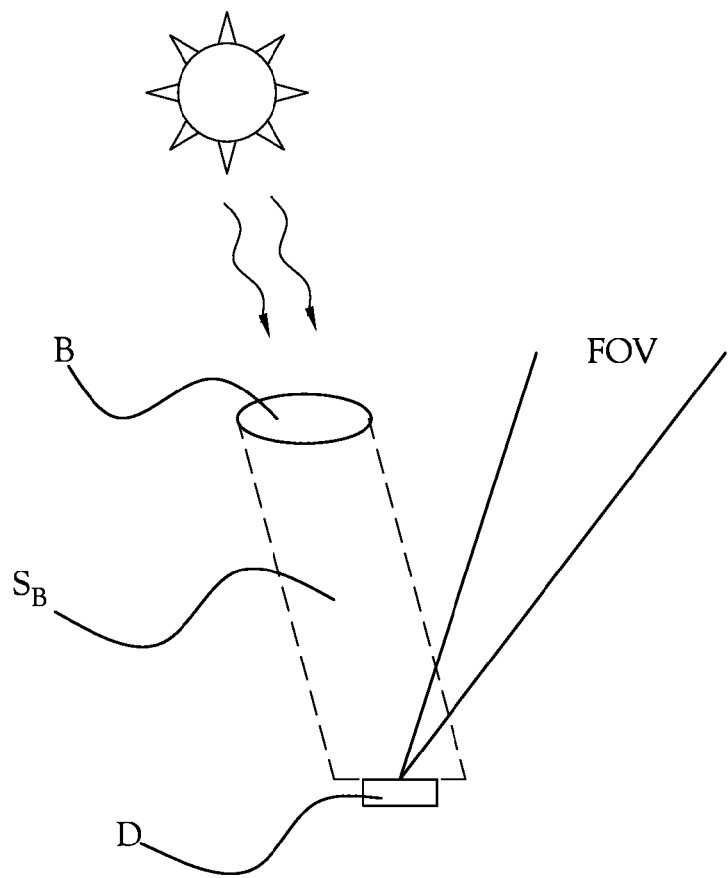
FIG. 8A illustrates a blade shadow event passing a detector field of view.
Figure 8B:
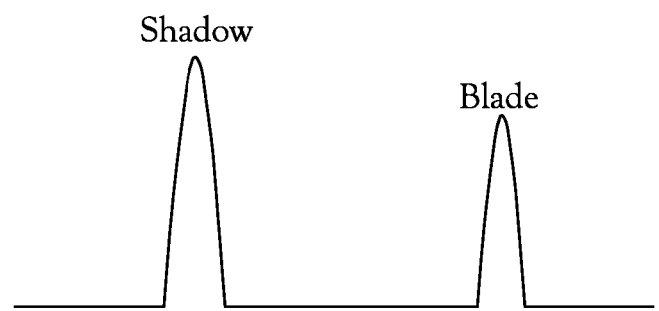
FIG. 8B illustrates an undesirable shadow signal which can be attenuated by using the systems and methods of the present general inventive concept.

Referring to FIGS. 8A and 8B, when the blade B passes between the sun and the aperture of the detector, the direct rays from the sun are interrupted, creating a temporary shadow $S_B$ incident on the detector. If the sun's direct rays are not diverted, then the sensor D will see a decrease in light to match the shadow. This can appear in the signal chain as a false blade pass signal, or false blade event, as illustrated in FIG. 8B, as distinguished from a true blade event, which occurs when the blade actually passes the detector FOV.

Figure 9:
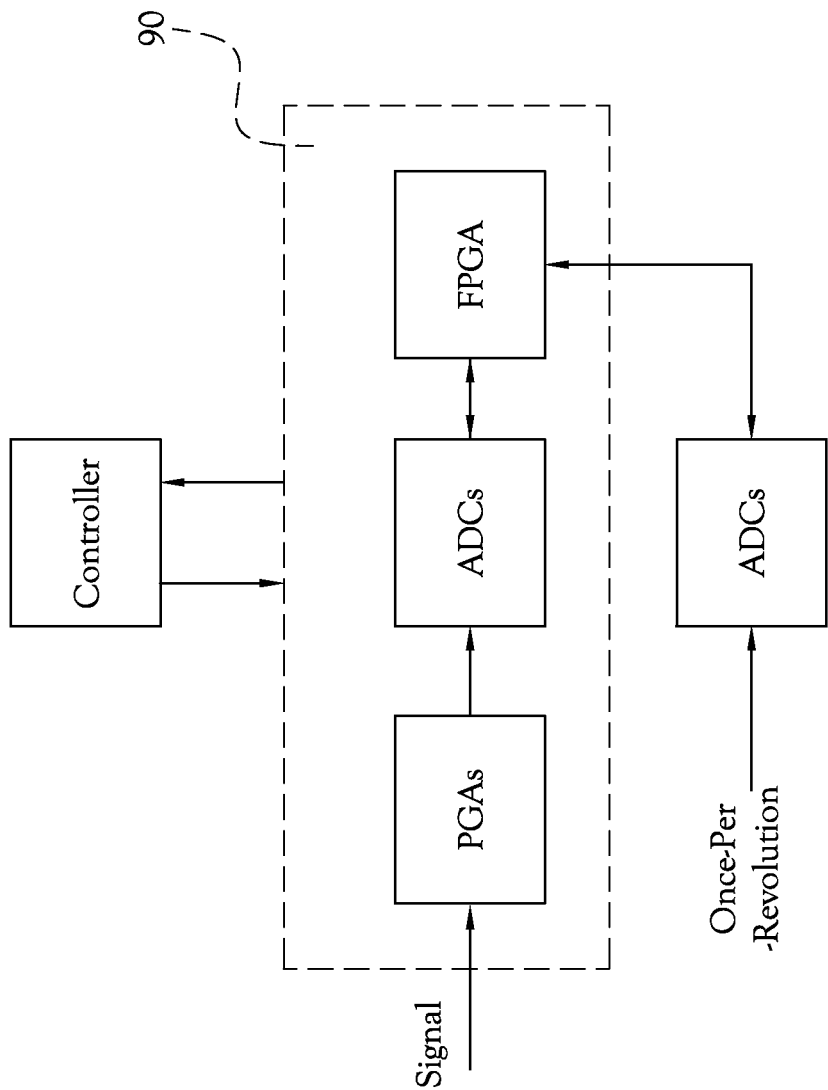
FIG. 9 is a block diagram illustrating a peak detector module configured in accordance with an example embodiment of the present general inventive concept.

FIG. 9 is a block diagram illustrating a peak detector module 90 configured in accordance with example embodiments of the present general inventive concept. In some embodiments, the once-per-revolution signals can be connected to Analog to Digital Converters (ADCs), which are connected to a Field Programmable Gate Array (FPGA) which can extract various digital information about each signal. A programmable gain amplifier (PGA) under control of the FPGA can be included between the pre-amp output signals and the ADC.

Characterizing and measurements of the pulses are done by leveraging the technology of digital signal processing, including FPGAs. In some embodiments, a microcontroller (microprocessor) is used to configure and control the operation of the FPGA as well as pull timing and other information from the FPGA. An adjustable low-pass filter implemented in the FPGA can be used to reduce the amount of high frequency noise on the signal. Minimum and/or maximum values over a specific time window for each signal are continually updated. To capture timing information, the FPGA monitors the signal to watch for it to pass through the threshold level. When this rising edge event occurs, the current time is added onto a specific register stack. When the signal falls below the same threshold, a trailing edge event occurs and the current time is added onto a falling edge register stack. The microprocessor, which handles the calculation of blade track, periodically monitors the register stacks to see when new blade passes have occurred. By implementing storage of the timing information onto a stack within the FPGA, critical timing requirements between the microprocessor and FPGA that would have otherwise been needed are removed. The FPGA can include a notch filter to remove noise of a specific frequency from the signal.

In a similar nature to the detector signal path, a once-per-revolution signal (tach) can be processed through an ADC and monitored and conditioned by the FPGA. The timing and counting of blade events allows the system to identify which blade is No. 1, and knowing the number of blades enables the system to keep track of each blade rotation, and to correlate signals to a corresponding rotation of the blade, and to a particular blade. This information can be used to determine time of rotation for height calculations, and to determine operating characteristics of a particular blade with respect to other blades. Autocorrelations can remove spurious 'false' blade events, such as if a bird passes by the detector field of view. For example, the processor can collect data from a plurality of rotations, and can use statistical timing correlations to distinguish a true blade event from a false blade event, and the FPGA processor can determine a blade track, or path of each blade, based on the collected data.

Having a processor collect the events and correlate them with the once per revolution allows the system to develop patterns and filter erroneous pulses by comparing the timing of the events during a rotation over several rotations.

Figure 10A:
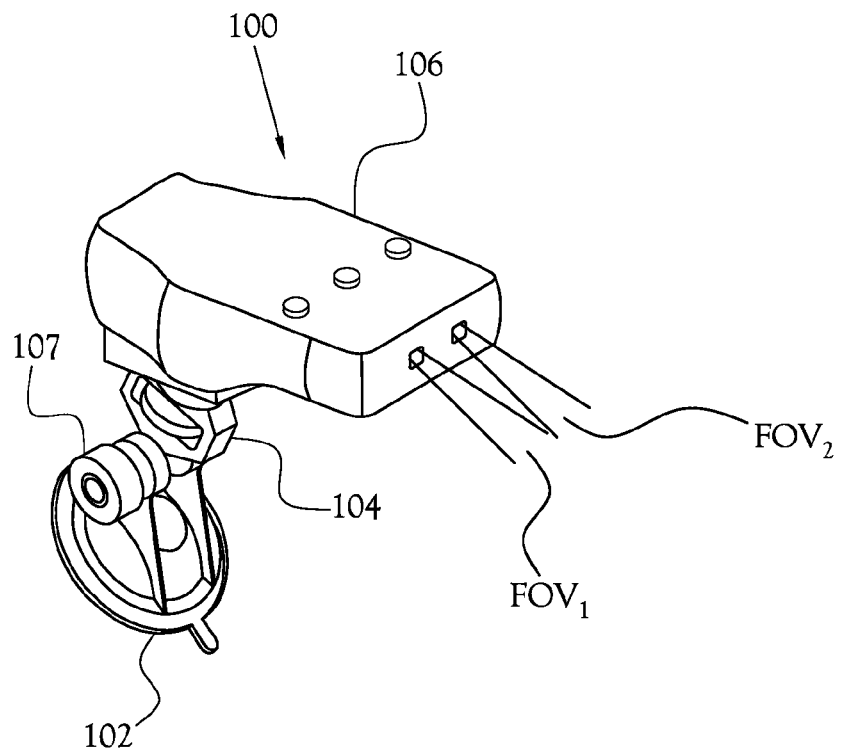
FIGS. 10A and 10B illustrate an example detector unit having a pair of fields of view (FOV) configured in accordance with an example embodiment of the present general inventive concept.
Figure 10B:
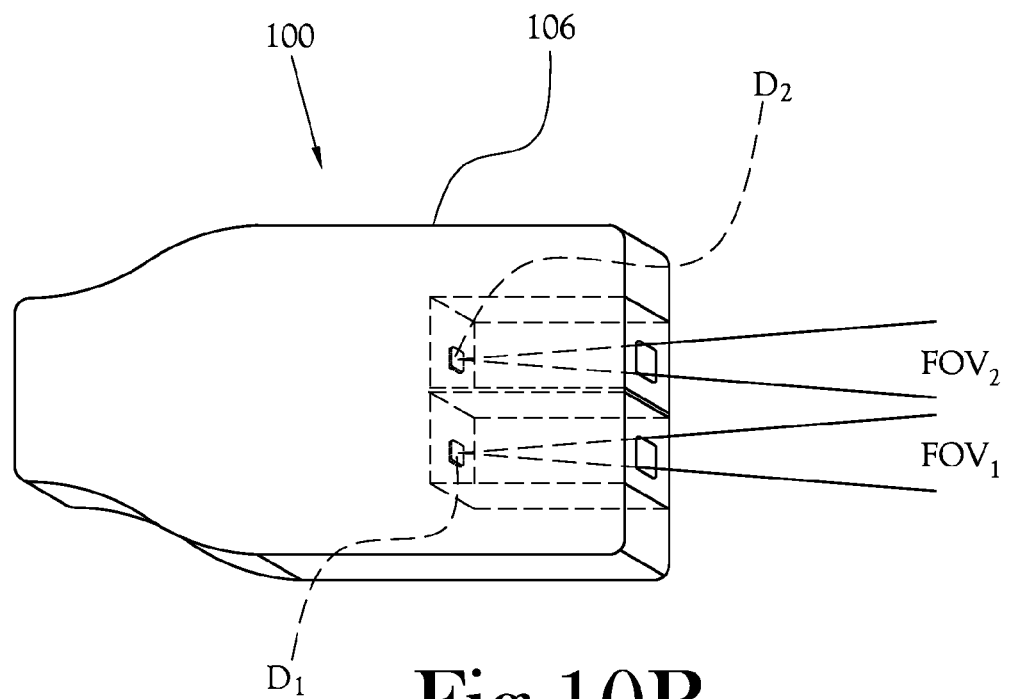

FIGS. 10A and 10B illustrate an example detector housing 100 configured in accordance with an example embodiment of the present general inventive concept. As illustrated in FIG. 10A, the detector housing 100 can include a mounting section 102 to mount the detector to a suitable location on the device under test, for example in the cockpit of a helicopter. The mounting section 102 can include adjustment members 104, 107 to enable the entrance apertures defining the fields of view $FOV_1$ and $FOV_2$ to be aimed in an appropriate direction based on the orientation of the object(s) to be sensed. The housing 106 can contain a pair of detector units having detectors $D_1$ and $D_2$, including optical components, similar to those described above in connection with FIG. 7A.

FIG. 11 is a system block diagram according to an example embodiment of the present general inventive concept. As illustrated in FIG. 11, example embodiments include a pair of detector units $D_1$ and $D_2$ which cooperate to provide a pair of divergent fields of view to capture changes in radiation incident on a respective pair of radiation sensors. The output of the detectors are presented to a pair of I-to-V converters, respectively. The current supplied to the converters by the detectors is adjusted by Background subtraction modules so that the output generated by the I-to-V converters contains just the blade signal current that is relevant to the blade tracking system. In this embodiment, the converter output is presented to a peak detection module processor to calculate edge times of the signals, for example leading edge times and trailing edge times, under the control of the Controller. The Controller can be used to evaluate the peaks and can adjust the control logic for peak detection, including polarity, gain, threshold levels, and the like. The controller can output data to a host device for display and/or further processing. The controller can include processing and storage components to collect signals over time and correlate the signals to a respective blade event or rotation from a once per revolution signal. Although the diagrams often show the various components formed as separate units, it will be appreciated that using sound engineering judgment, many, if not all, of the components can be formed either as separate units or as a single unit. For example, in FIG. 11, the controller, peak detector, once per revolution module, background subtraction module, and I-to-V converter, can all be integrated into a single unit or processor, or they can be formed as separate units, or a combination thereof.

Embodiments of the present general inventive concept can provide improved optics by utilizing multiple apertures and insulated chambers to minimize false detection events and improve system reliability. Improved preamplifier circuits are implemented to automatically remove ambient light conditions to enhance the range of lighting conditions where the system may be used. Improved blade pass event detection logic with adjustable detection thresholds enhance the range of contrast conditions in which the system can operate. Improved timing measurement logic incorporating both leading and trailing edge event times improves the accuracy of the blade pass event time measurements and the accuracy of the overall system.

In some embodiments, the optics path can incorporate multiple apertures arranged in such a way to collimate the field of view of the divergent detectors and create multiple optical chambers that each serve to reduce the effects of shadow events caused by stray light entering the optics system. Each chamber and its exit aperture act to capture the indirect uncollimated light and allow a small portion of the scattered light to enter the next chamber while permitting most of the collimated path to proceed unattenuated into the next chamber.

In some embodiments, the pre-amplifier circuits are enhanced to remove the average ambient level as the photo detector signal is converted to a voltage for later processing. The removal of the ambient light levels at signal conversion allows blade pass events to be detected over a wide range of ambient lighting conditions.

Embodiments also provide improved blade pass event detection logic that permits variable gains and adjustable thresholds to be applied to detect the blade event. This feature permits the invention to work over a wide range of low contrast situations such as gray blades against a nearly same gray sky.

Embodiments provide enhanced pulse time measurement logic to measure both the start of the blade pass event and the end of the blade pass event. Since rotor blades may be of differing ages and surface conditions the absolute pulse height in the detection event will change with differing blade characteristics. By utilizing both the detection start time and the detection end time, embodiments of the present general inventive concept can better estimate the true blade event time at the detector by averaging the start and end times. This time can be invariant of the pulse height that may vary from blade to blade.

It is noted that the simplified diagrams and drawings do not illustrate all the various connections and assemblies of the various components, however, those skilled in the art will understand how to implement such connections and assemblies, based on the illustrated components, figures, and descriptions provided herein, using sound engineering judgment.

The present general inventive concept can also be embodied as computer-readable codes on a computer-readable medium. The computer-readable medium can include a computer-readable recording medium and a computer-readable transmission medium. The computer-readable recording medium is any data storage device that can store data as a program which can be thereafter read by a computer system. Examples of the computer-readable recording medium include read-only memory (ROM), random-access memory (RAM), CD-ROMs, DVDs, magnetic tapes, floppy disks, flash memory in FPGAs, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

It is noted that numerous variations, modifications, and additional embodiments are possible, and accordingly, all such variations, modifications, and embodiments are to be regarded as being within the spirit and scope of the present general inventive concept. For example, regardless of the content of any portion of this application, unless clearly specified to the contrary, there is no requirement for the inclusion in any claim herein or of any application claiming priority hereto of any particular described or illustrated activity or element, any particular sequence of such activities, or any particular interrelationship of such elements. Moreover, any activity can be repeated, any activity can be performed by multiple entities, and/or any element can be duplicated. Accordingly, while the present general inventive concept has been illustrated by description of several example embodiments, it is not the intention of the applicant to restrict or in any way limit the scope of the inventive concept to such descriptions and illustrations. Instead, the descriptions, drawings, and claims herein are to be regarded as illustrative in nature, and not as restrictive, and additional embodiments will readily appear to those skilled in the art upon reading the above description and drawings.

The invention claimed is:

1. A rotor blade tracking system, comprising:
a detector housing having a pair of detector units, each detector unit of the pair of detector units having a sensor to generate signals based on changes in incident radiation to the respective sensor as a rotor blade passes a field of view of the respective detector unit, each detector unit of the pair of detector units including:
at least a first chamber and a second chamber,
the first and second chamber defined by a plurality of side walls common to the first and second chambers and a dividing wall separating the first and second chambers,
an entrance aperture configured to pass incident radiation from outside the detector unit into the first chamber,
an internal aperture formed in the dividing wall configured to pass the incident radiation from the first chamber into the second chamber,
the entrance aperture having a center that is located a first distance from one side wall of the plurality of side walls and the internal aperture having a center that is located a second distance from the one side wall of the plurality of side walls,
the entrance and internal apertures being positioned in a staggered manner such that the first distance, is not equal to the second distance to create an optics path from the entrance aperture through the internal aperture to the sensor to define the field of view of the detector unit; and
a processor configured to calculate a pass time for the rotor blade to pass through both fields of view based on a time difference between selected locations of signals generated when the rotor blade passes through each field of view, respectively.

2. The rotor blade tracking system of claim 1, wherein for each detector unit of the pair of detector units:
the dividing wall is a baffle, and wherein the entrance and internal apertures are positioned such that a portion of the incident radiation moves through the optics path to the sensor unattenuated while the remainder of the incident radiation is attenuated in the first chamber and does not enter the second chamber via the optics path.

3. The rotor blade tracking system of claim 1, wherein each of the generated signals is a pulse signal having a leading edge and a trailing edge as the rotor blade enters and exits the respective field of view.

4. The rotor blade tracking system of claim 3, wherein the processor is configured to select a location between the leading and trailing edges based on a leading edge start time and a trailing edge end time of each of the generated signals, and to calculate the pass time for the rotor blade to pass through both fields of view based on a time difference between the respective selected locations between the leading edges and the trailing edges of each respective generated signal.

5. The rotor blade tracking system of claim 3, wherein the processor is configured to calculate the pass time based on a time difference between respective averages of measured times between the leading and trailing edges.

6. The rotor blade tracking system of claim 5, wherein the averages are the midpoints of the measured times between the leading and trailing edges.

7. The rotor blade tracking system of claim 1, wherein the selected locations are midpoints between leading edges and trailing edges of each respective generated signal.

8. The rotor blade tracking system of claim 7, wherein the processor is configured to determine a threshold level for each of the generated signals based on an amplitude of the respective generated signals, and the processor calculates a midpoint for each generated signal based on the leading edge start time and the trailing edge end time at the threshold level, respectively.

9. The rotor blade tracking system of claim 8, wherein the threshold level is adjusted based on the amplitude of prior signals of the generated signals.

10. The rotor blade tracking system of claim 1, wherein the processor determines a height of the rotor blade based on the pass time.

11. The rotor blade tracking system of claim 10, wherein the rotor blade is one of a plurality of rotor blades, and wherein the processor is configured to calculate the pass time for each rotor blade of the plurality of rotor blades and to compare the pass times of different rotor blades of the plurality of rotor blades to compute lead/lag characteristics of a given rotor blade of the plurality of rotor blades relative to another rotor blade of the plurality of rotor blades.

12. The rotor blade tracking system of claim 1, wherein each of the generated signals contains a component corresponding to a level of background radiation incident on a respective sensor of the sensors, and the rotor blade tracking system further comprises a background subtraction module to adjust the respective generated signal based on changes in the level of background radiation before the pass time is calculated.

13. The rotor blade tracking system of claim 1, wherein the processor is configured to determine a time period at which the generated signals are at a maximum or minimum.

14. The rotor blade tracking system of claim 1, wherein the processor includes gain electronics to enhance signal levels of the generated signals.

15. The rotor blade tracking system of claim 14, wherein the processer is configured to determine an amplitude of each of the generated signals, and adjusts the gain electronics based on the amplitude.

16. The rotor blade tracking system of claim 1, wherein the processor includes a low pass filter to remove noise from an output of each sensor.

17. The rotor blade tracking system of claim 1, wherein the processor includes a notch filter to remove noise of a specific frequency from the generated signals.

18. The rotor blade tracking system of claim 1, further comprising a radiation source to illuminate the blade when the incident radiation reaches a predetermined level.

19. The rotor blade tracking system of claim 1, wherein the processor is configured to collect data from a plurality of rotations and to use statistical timing correlations to distinguish a true blade event from a false blade event.

20. The rotor blade tracking system of claim 19, wherein the processor is configured to determine a blade track based on the collected data.

21. The rotor blade tracking system of claim 1, wherein the generated signals are digital signals, and wherein the selected locations of the generated signals are between maxima and minima of the digital signals.

22. The rotor blade tracking system of claim 1, wherein the processor is configured to calculate a pass time for the rotor blade to pass through both fields of view based on a time period between which the generated signals from the sensors are at maxima or minima.

23. The rotor blade tracking system of claim 1, wherein the generated signals are digital signals, and the processor is configured to calculate the pass time based on curve-fitting and/or using digital constant-fraction discriminators.

24. The rotor blade tracking system of claim 1, wherein the processor comprises a field-programmable gate array (FPGA) to curve fit data from the generated signals to find center times of pulse signals.

25. The rotor blade tracking system of claim 1, wherein the pass time is based on rotor blade pass event times through the respective optics paths forming the fields of view.

26. The system of claim 1, wherein the fields of view combine to form a cone-shaped field of known dimensions, and wherein the processor calculates a time in the cone-shaped field for the rotor blade based on the time differences between the generated signals.

27. The system of claim 26, wherein the fields of view diverge from each other extending from the entrance apertures.

28. A rotor blade tracking system, comprising:
a detector housing having a pair of detector units, each detector unit of the pair of detector units having a sensor to generate signals based on changes in incident radiation to the respective sensor as a rotor blade passes a field of view of the respective detector unit, each detector unit of the pair of detector units including:
at least a first chamber and a second chamber,
the first and second chamber defined by a plurality of side walls common to the first and second chambers and a dividing wall separating the first and second chambers,
an entrance aperture configured to pass incident radiation from outside the detector unit into the first chamber,
an internal aperture formed in the dividing wall configured to pass the incident radiation from the first chamber into the second chamber, the entrance aperture having a center that is located a first distance from one side wall of the plurality of side walls and the internal aperture having a center that is located a second distance from the one side wall of the plurality of side walls, the entrance and internal apertures being positioned in a staggered manner such that the first distance is not equal to the second distance to create an optics path from the entrance aperture through the internal aperture to the sensor to define the field of view of the detector unit; and the optics path of each detector unit of the pair of detector units being aimed at an angle so that the respective fields of view of each detector unit of the pair of detector units diverge from one another outside the detector housing, the incident radiation including background radiation incident to the sensors;

a background subtraction module to remove at least a portion of a signal associated with the background radiation to define a background subtracted signal; and a processor configured to calculate a pass time for the rotor blade to pass through both fields of view based on a time difference between selected locations of signals generated when the rotor blade passes through each field of view, respectively.

29. A method of tracking a rotor blade, comprising:

detecting incident radiation on a pair of sensors respectively provided in a pair of detector units in a detector housing as a rotor blade passes fields of view extending from the respective detector units, wherein for each detector unit of the pair of detector units:

at least a first chamber and a second chamber, the first and second chamber defined by a plurality of side walls common to the first and second chambers and a dividing wall separating the first and second chambers, an entrance aperture configured to pass incident radiation from outside the detector unit into the first chamber, an internal aperture formed in the dividing wall configured to pass the incident radiation from the first chamber into the second chamber, the entrance aperture having a center that is located a first distance from one side wall of the plurality of side walls and the internal aperture having a center that is located a second distance from the one side wall of the plurality of side walls, the entrance and internal apertures being positioned in a staggered manner such that the first distance is not equal to the second distance to create an optics path from the entrance aperture to the sensor of the detector unit to define the field of view of the detector unit;

the optics path of each detector unit of the pair of detector units being aimed at an angle so that the respective fields of view of each detector unit of the pair of detector units diverge from one another outside the detector housing;

generating signals based on changes in the detected incident radiation to the pair of sensors; and calculating a pass time for the rotor blade to pass through both fields of view based on a time difference between selected locations of signals generated when the rotor blade passes through each field of view, respectively.

30. The method of claim 29, wherein the selected locations of the generated signals are between leading and trailing edges of each generated signal based on a leading edge start time and a trailing edge end time of the leading edge and trailing edge, respectively.

31. The method of claim 30, further comprising:

calculating a threshold level for each generated signal based on an amplitude of each generated signal, respectively; and calculating a midpoint for each generated signal based on the leading edge start time and the trailing edge end time at the threshold level, respectively.

32. The method of claim 29, wherein the generated signals contain a component corresponding to a level of background radiation, the method further comprising:

adjusting the respective generated signals to correspond to changes in the level of background radiation before the pass time is calculated.

33. The method of claim 29, wherein the blade rotates a plurality of times with respect to both fields of view, the method further comprising:

correlating the generated signals to a corresponding rotation of the blade, respectively, such that signals generated during a same rotation are used to calculate the pass time.

* * * * *